United States Patent
Kumazawa et al.

(10) Patent No.: US 6,618,954 B2
(45) Date of Patent: Sep. 16, 2003

(54) LONGITUDINAL PROFILE MEASURING APPARATUS

(75) Inventors: Masakuni Kumazawa, Tokyo (JP); Mutsumi Takahashi, Tokyo (JP); Takehiko Suyama, Tokyo (JP); Tatsuyuki Ochi, Tokyo (JP)

(73) Assignee: Tokimec Construction Systems Inc., Tokyo (JP)

( * ) Notice: Subject to any disclaimer, the term of this patent is extended or adjusted under 35 U.S.C. 154(b) by 0 days.

(21) Appl. No.: 09/865,529

(22) Filed: May 29, 2001

(65) Prior Publication Data

US 2002/0007562 A1 Jan. 24, 2002

(30) Foreign Application Priority Data

May 30, 2000 (JP) ........................................ 2000-161246

(51) Int. Cl.[7] ................................................ G01B 5/20
(52) U.S. Cl. ........................... 33/533; 33/521; 356/601; 73/146
(58) Field of Search ........................... 33/533, 1 H, 521, 33/772, 773, 775, 1 Q; 356/511, 601, 602; 702/5, 150; 73/146, 597; 367/104; 250/559.21, 559.22, 559.26, 231.13, 231.14

(56) References Cited

U.S. PATENT DOCUMENTS

| 4,137,638 A | * | 2/1979 | Watts | 33/141.5 |
| 4,571,695 A | * | 2/1986 | Elton et al. | 364/550 |
| 4,653,316 A | * | 3/1987 | Fukuhara | 73/146 |
| 4,741,207 A | * | 5/1988 | Spangler | 73/146 |
| 5,065,618 A | * | 11/1991 | Hodges et al. | 73/146 |
| 5,323,647 A | * | 6/1994 | Blanco | 73/146 |
| 5,745,225 A | * | 4/1998 | Watanabe et al. | 356/4.01 |
| 6,035,542 A | * | 3/2000 | Woznow et al. | 33/533 |

FOREIGN PATENT DOCUMENTS

JP          02284020       *  11/1990

* cited by examiner

*Primary Examiner*—Diego Gutierrez
*Assistant Examiner*—Tania Courson
(74) *Attorney, Agent, or Firm*—McGinn & Gibb, PLLC

(57) ABSTRACT

A longitudinal profile measuring apparatus including a relative distance meter located on a frame supported by more than two wheels in a row in a direction of a measuring line for measuring relative distance to a target surface, a moving distance meter for measuring moving distance of movement along the measuring line on the target surface, and a data processing unit for finding spatial data, which shows a rough profile of the target surface, along the measuring line from the relative distance measured by the relative distance meter. The data processing unit storing moving distance data associated with relative distance data to the target surface and transforming the relative distance data of the stored data into amplitude corresponding to frequency, multiplying the amplitude corresponding to frequency by a coefficient of correction for allowing the apparatus to have a gain with a desired frequency characteristic for correction, and inverse transforming the corrected amplitude to find the corrected spatial data of the target surface.

7 Claims, 10 Drawing Sheets

(a) MEASURING TARGET TOPOGRAPHY

(b) MEASUREMENT RESULT (BEFORE CORRECTION)   IRI=1.155

(c) MEASUREMENT RESULT (AFTER CORRECTION)   IRI=1.373

(d) IRI THEORETICAL WAVEFORM   IRI=1.376

(e) IN CASE OF SENSOR ON CENTER OF FRAME OF 3m AND WHEELS AT BOTH ENDS
   IRI=0.685

LONGITUDINAL PROFILE MEASURING APPARATUS

BACKGROUND OF THE INVENTION

1. Field of the Invention

The present invention relates to a longitudinal profile measuring apparatus for measuring longitudinal profiles of roads, airports, rails, tunnels or the like, and more specifically, to a longitudinal profile measuring apparatus which is capable of accommodating specified evaluating techniques.

2. Description of the Related Art

Longitudinal profile measuring apparatuses which have been conventionally used are of two types. One is called a wheel type in which the apparatus has a relative distance meter located in a center of a frame supported by a plurality of wheels and is moved along a measuring line manually to measure a moving distance and a relative distance to a target surface. A graph is output on which the abscissa represents moving distance and the ordinate represents relative distance for showing a rough profile. The other apparatus is called a reaction or an inertial type in which a vehicle, provided with a relative distance meter, an acceleration meter and a moving distance meter, travels on the target surface to measure the rough profile from both outputs of the relative distance meter and acceleration meter.

When a road is measured as a target surface, for example, evaluation of the roughness of its longitudinal profile is used as an evaluation of road quality. This is used to determine the need for road repair or as an evaluation of the quality of road construction and is a useful technique in the industry.

In order to unify the evaluation, for example, an International Roughness Index (IRI) has been developed and proposed in association with investments by the World Bank. In order to calculate the IRI, it is necessary to measure a rough profile of a road surface by means of an apparatus having gain with a specified frequency characteristic. The specified frequency characteristic is artificially determined based on riding comfort of a car which is called "a golden car".

However, in a conventional longitudinal profile measuring apparatus of the wheel type, the frequency characteristic has a roughness which is determined depending upon a physical space between the wheels. This causes a problem in that the specified frequency characteristic such as the IRI cannot be accommodated.

Further, while a sub-frame can be added to increase multiplicity for making the frequency characteristic even, this requires the use of more wheels and a complex structure.

Further, finding the IRI requires information on a gradient, however, in the conventional longitudinal profile measuring apparatus of a wheel type, a relative distance to a target surface is obtained directly. Thus, there is a problem that detecting sensitivity to a short wavelength with low roughness is reduced even for the same gradient.

On the other hand, in the reaction or inertial type of longitudinal profile measuring apparatus, measurement should be carried out in a certain high-speed condition. This requirement causes a problem in that measurement is impossible in a low-speed condition or when stopping at a signal or the like. Thus, it becomes difficult to measure a short distance and requires correction at a curve or the like.

Also, a problem is that the apparatus requires a sensor with high accuracy, which results in a higher price.

SUMMARY OF THE INVENTION

In view of the foregoing and other problems, disadvantages, and drawbacks of the conventional longitudinal profile measuring apparatuses, the present invention has been devised, and has as its object the provision of a longitudinal profile measuring apparatus which can be configured at a low price and is provided with a desired frequency characteristic.

In order to attain the object suggested above, and to solve the above problems, a longitudinal profile measuring apparatus according to the present invention includes a frame supported by more than two wheels in a row in a direction of a measuring line, a relative distance meter located on the frame for measuring relative distance to a target surface, a moving distance meter for measuring moving distance of movement along the measuring line on the target surface, and data processing means for finding spatial data, which show a rough profile of the target surface, along the measuring line from the relative distances measured by the relative distance meter.

The data processing means includes storing means for storing relative distance data to the target surface measured by the relative distance meter associated with moving distance data measured by the moving distance meter when moving along the measuring line, frequency transforming means for transforming the relative distance data of the data stored by the storing means into amplitude corresponding to frequency, correction coefficient multiplying means for multiplying the amplitude corresponding to frequency by coefficient of correction for allowing the apparatus to have a gain with a desired frequency characteristic, and inverse frequency transforming means for inverse transforming the corrected amplitude to find the corrected spatial data of the target surface.

A longitudinal profile can be captured in the form of gathered relative distance data to the target surface per predetermined distance from a base point measured by the relative distance meter. The data includes a roughness with small variation and a roughness with large variation. Taking notice of such cycle variation, Fourier transform by the frequency transforming means allows the data to be transformed into the amplitude corresponding to frequency. In the Fourier transform, the spatial data on which the abscissa represents the moving distance and the ordinate represents relative distance and frequency amplitude data on which the abscissa represents the frequency and the ordinate represents components of sine and cosine can be mutually transformed. By means of the Fourier transform, a spatial function f(x) of the cycle L is developed into an orthogonal function series of $\sin(\omega_n X)$ and $\cos(\omega_n X)$ with each frequency $\omega_n = 2n\pi/L$ as the following equation:

$$F(j\omega_n) = \int_{-L/2}^{L/2} f(x) e^{-j\omega_n x} dx \qquad (1)$$

Amplitudes of $\sin(\omega_n X)$ and $\cos(\omega_n X)$ are respectively represented in imaginary and real parts of the equation (1).

A function of the frequency $F(j\omega_n)$ is inverse Fourier transformed by the following equation by the inverse frequency transforming means to be returned to the function of the space f(x).

$$f(x) = \frac{1}{L} \cdot \sum_{n=-\infty}^{\infty} F(j\omega_n) e^{j\omega_n x} \qquad (2)$$

Figure 3:
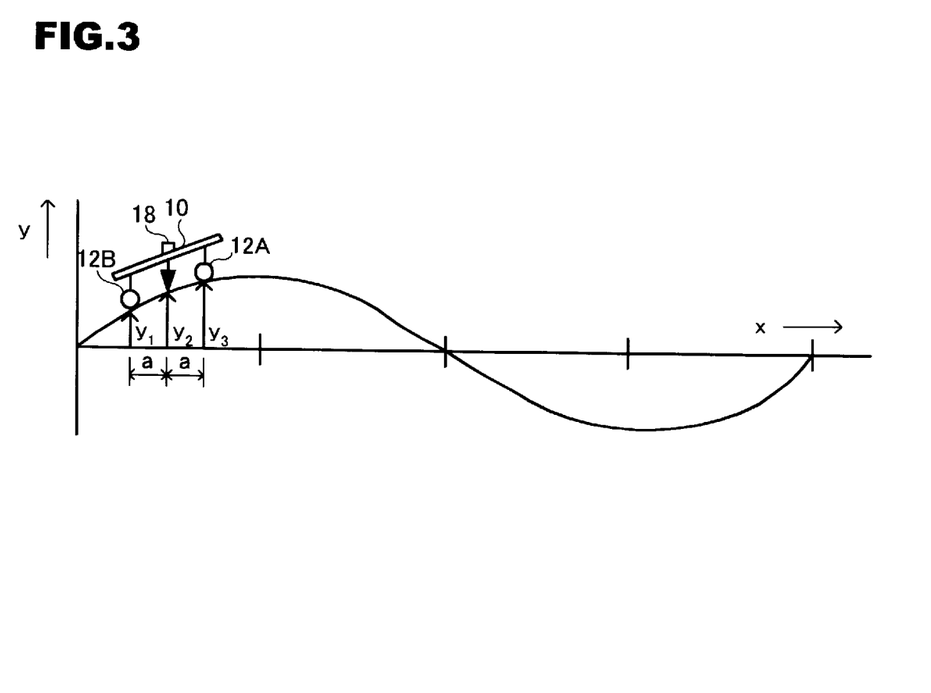
FIG. 3 is an explanatory view for understanding the present invention showing an apparatus in which both ends of a frame are supported by two wheels and a relative distance meter is located at a center, moving on a sine wave.

Now, considering the apparatus shown in FIG. 1, having the frame 10 supported at both its ends by the wheels 12A, 12B and having the relative distance meter 18 located on its center, as shown in FIG. 3, measuring gain of the apparatus has a frequency characteristic as described below when a space between each of the wheels 12A, 12B and the relative distance meter 18 is "a".

Namely, when the apparatus moves on a triangular wave $e^{j\omega_n x}$ of angular frequency $\omega_n$ as shown in FIG. 3, output $f\omega_n(X)$ of the relative distance meter can be represented by the following equation:

$$f\omega_n(x) = C - \left(y_2 - \frac{(y_1 + y_3)}{2}\right) \quad (3)$$
$$= C - e^{j\omega_n x} + \frac{(e^{j\omega_n(x-a)} + e^{j\omega_n(x+a)})}{2}$$
$$= C - (1 - \cos(\omega_n a)) \cdot e^{j\omega_n x}$$

where C represents mounting distance of a sensor and is constant.

Accordingly, the measuring gain G is as follows:

$$G = 1 - \cos(\omega_n a) \quad (4)$$

Here, when a wavelength is $\lambda$, $\omega = 2\pi/\lambda$ to be as follows:

$$G = 1 - \cos(2\pi a/\lambda) \quad (5)$$

Figure 4:
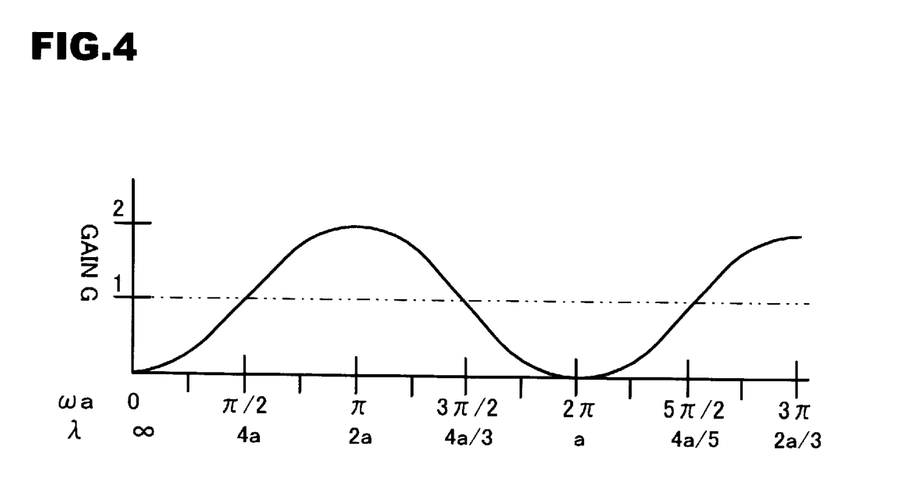
FIG. 4 is a graph showing a relationship between gain (G) measured by the apparatus in FIG. 3 and frequency and a wavelength of the sine wave.

The gain is determined by a ratio of $a/\lambda$ as shown in FIG. 4. As clarified in the figure, the inherent frequency characteristic of the gain specific to the apparatus is as follows:

When $\lambda = 2a/(2N+1)$, $G = 1 - \cos((2N+1)\pi) = 2$, which is maximum

When $\lambda = a/N$, $G = 1 - \cos(2\pi N) = 0$, which is minimum where N represents integer.

Figure 5:
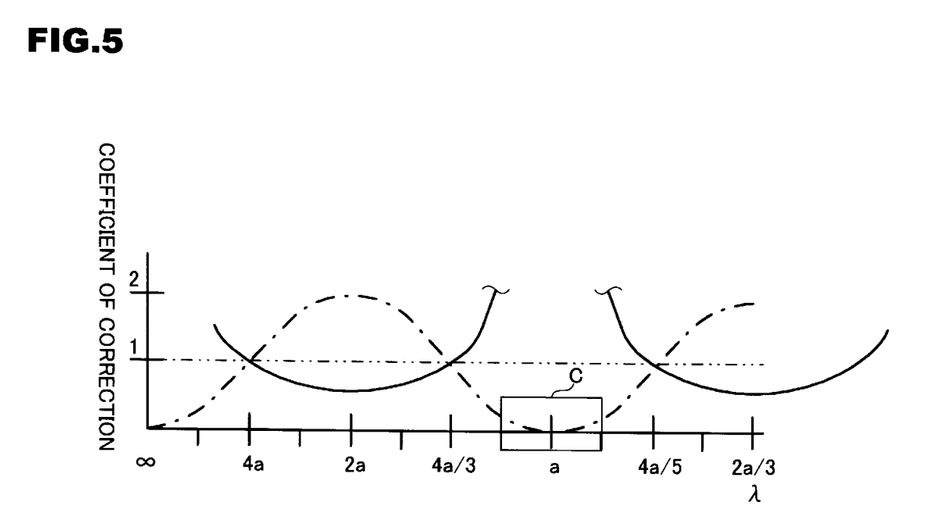
FIG. 5 is a graph showing a coefficient of correction.

The inherent frequency characteristic specific to this apparatus is obtained in advance by calculation or experiment. And, thereafter there is obtained the coefficient of correction so that this frequency characteristic will become any desired frequency characteristic. For example, when the apparatus is desired to have a certain constant frequency characteristic, as shown in FIG. 5, the coefficient of correction is made as shown by a continuous line against the original frequency characteristic of the gain shown by a dashed line for allowing the multiplied result to have a certain constant gain.

An influence of the frequency can be eliminated by measuring an optional longitudinal surface, finding the amplitude corresponding to frequency by the Fourier transform by the frequency transforming means, multiplying the amplitude by the coefficient of correction by the correction coefficient multiplying means and then returning the result to the longitudinal surface by the inverse Fourier transform by the inverse frequency transforming means.

Figure 6:
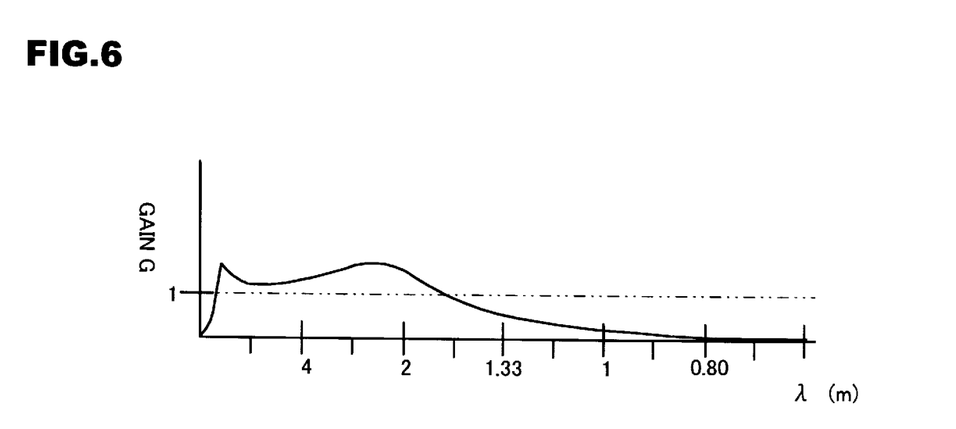
FIG. 6 is a graph showing an IRI characteristic.

When finding an IRI, the coefficient of correction is determined in advance such that a result of multiplying the coefficient of correction has an IRI characteristic as shown in FIG. 6, and after Fourier transformed and multiplied by the coefficient of correction, the data is inverse transformed into the spatial data and the IRI can be found by accumulating variations of gradient based on the spatial data.

Conventionally, the IRI has been found by accumulating variations of gradient detected by a measurement prototype called the golden car, which theoretically follows a vehicle dynamic model. The vehicle dynamic model of the golden car is defined by a spring modulus of tires, a spring modulus of axles, or weights of tires and axles, and has a different phase characteristic from that of this apparatus as well as the frequency characteristic. However a difference relative to the same wavelength between the golden car and this apparatus is constant. Thus by subtracting the difference from a phase as originally measured by this apparatus, an output waveform can be transferred so as to be a similar waveform obtained by the golden car. Alternatively, such a subtracting can be performed so that an output waveform can be transferred so as to reproduce a real longitudinal profile.

The coefficient of correction for a gain with a desired frequency characteristic and the difference of phase between a desired phase characteristic and an inherent phase characteristic can be found by simulation calculations. In the simulation calculations, frequency and phase characteristics of a simulation model of the apparatus responding to a step response are simulated and the simulated response is transformed by the Fourier transform to get a simulated frequency characteristic and a simulated phase characteristic. The coefficient of correction for a gain is then calculated by dividing a value at a certain frequency on the desired frequency characteristic by a value at the same frequency on the simulated frequency characteristic. The difference for phase is then calculated by subtracting a value at a certain frequency on the simulated phase characteristic from a value at the same frequency on the desired phase characteristic.

Besides the IRI, the apparatus can, of course, have an optional desired frequency characteristic such as to accommodate indexes other than the IRI, for example, a ride number (RN).

As shown in a part C of FIG. 5, when the gain becomes zero or close to zero, the coefficient of correction becomes large, leading to low accuracy. Thus, to have the desired frequency characteristic, it is desirable to reduce the roughness of the gain in a frequency band to be measured.

Therefore, by setting the spaces between the plurality of wheels and the relative distance meter to not be identical (e.g., to have different dimensions), the frequency characteristic of the gain can be made evener than a case where the spaces between the wheels and relative distance meter have the identical dimension (=a), as shown in FIG. 3. This is considered due to the influence of the various frequencies which are determined depending upon the different dimensions being mutually added. In the conventional measuring apparatus of wheel type, providing a single or multiple sub-frames makes the frequency characteristic of the gain evener and this effect tends to be larger for an increased number of multiple sub-frames. However, in the present invention, the frequency characteristic can be made even by a simple configuration without using the sub-frame. In the present invention, using the sub-frame in the simple configuration increases the effect.

The different dimensions of the spaces preferably have a ratio greater than 1:1.5 in case of internal division, and even more preferably greater than 1:2. In the case of the other ratio, external division is preferably taken. In the external division, the ratio is negative such as −1:3 and preferably more than −1:1.

Figure 7:
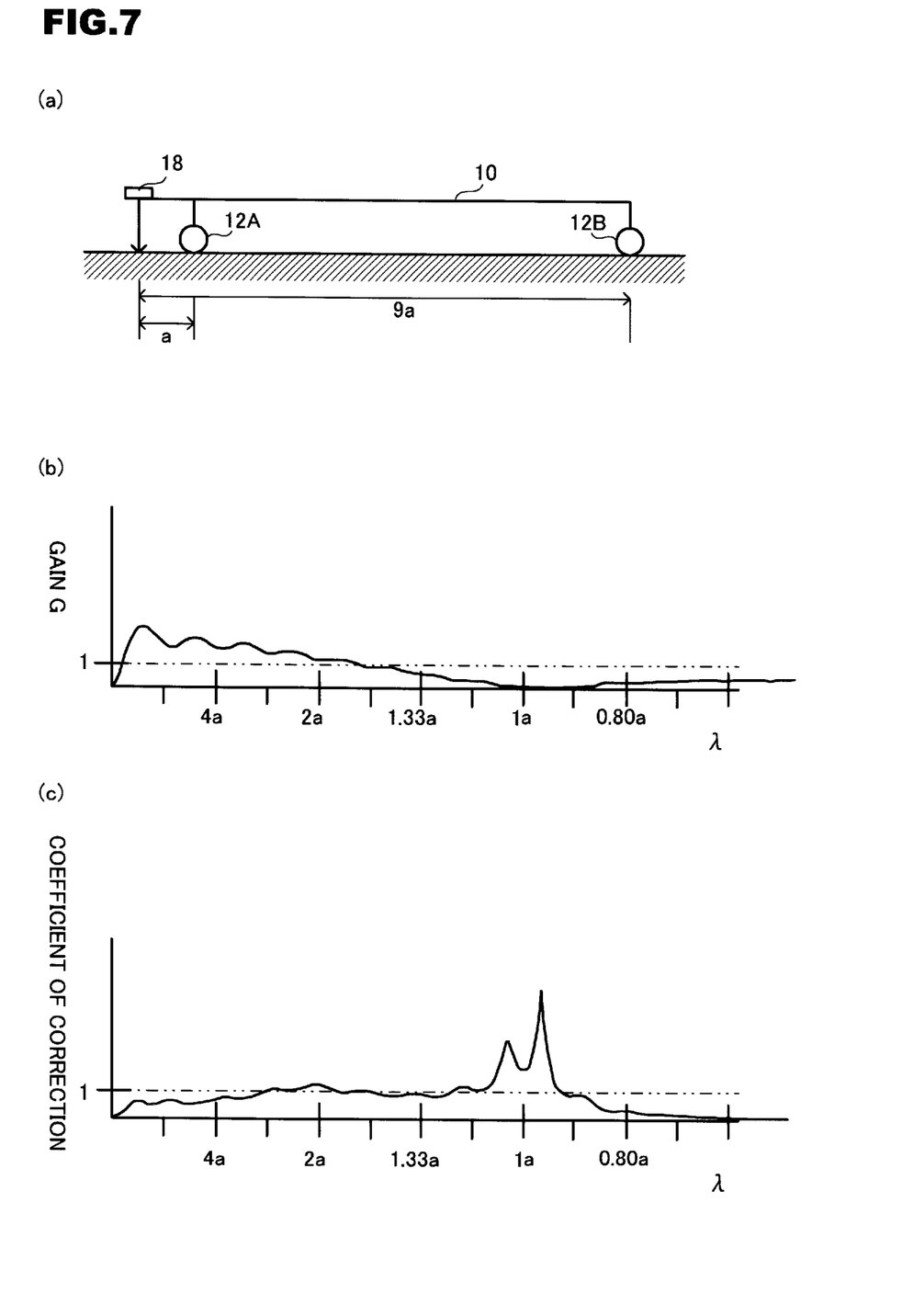
FIG. 7(a) is an explanation view of a positional relationship between the wheels and the relative distance meter; (b), a graph showing gain in measurement with the apparatus in (a); and (c), a graph of the coefficient of correction for obtaining the IRI characteristic.
FIG. 7(b) is a graph showing gain in measurement with the apparatus in (a)
FIG. 7(c) is a graph of the coefficient of correction for obtaining the IRI characteristic.

FIG. 7(a) shows an example of a ratio of −1:9 when externally divided such that the space between the relative distance meter 18 and one wheel 12A is "a" and the space between the relative distance meter 18 and the other wheel 12B is "9a", and FIG. 7(b) shows a frequency characteristic in this case. Such a large ratio makes the frequency band more even in comparison with the case shown in FIG. 4.

Further, when evaluation of the roughness of the longitudinal profile in terms of the gradient is necessary (e.g., like IRI), making the spaces between the plurality of wheels and the relative distance meter respectively different in dimension can increase detecting sensitivity to a short wavelength.

Figure 8:
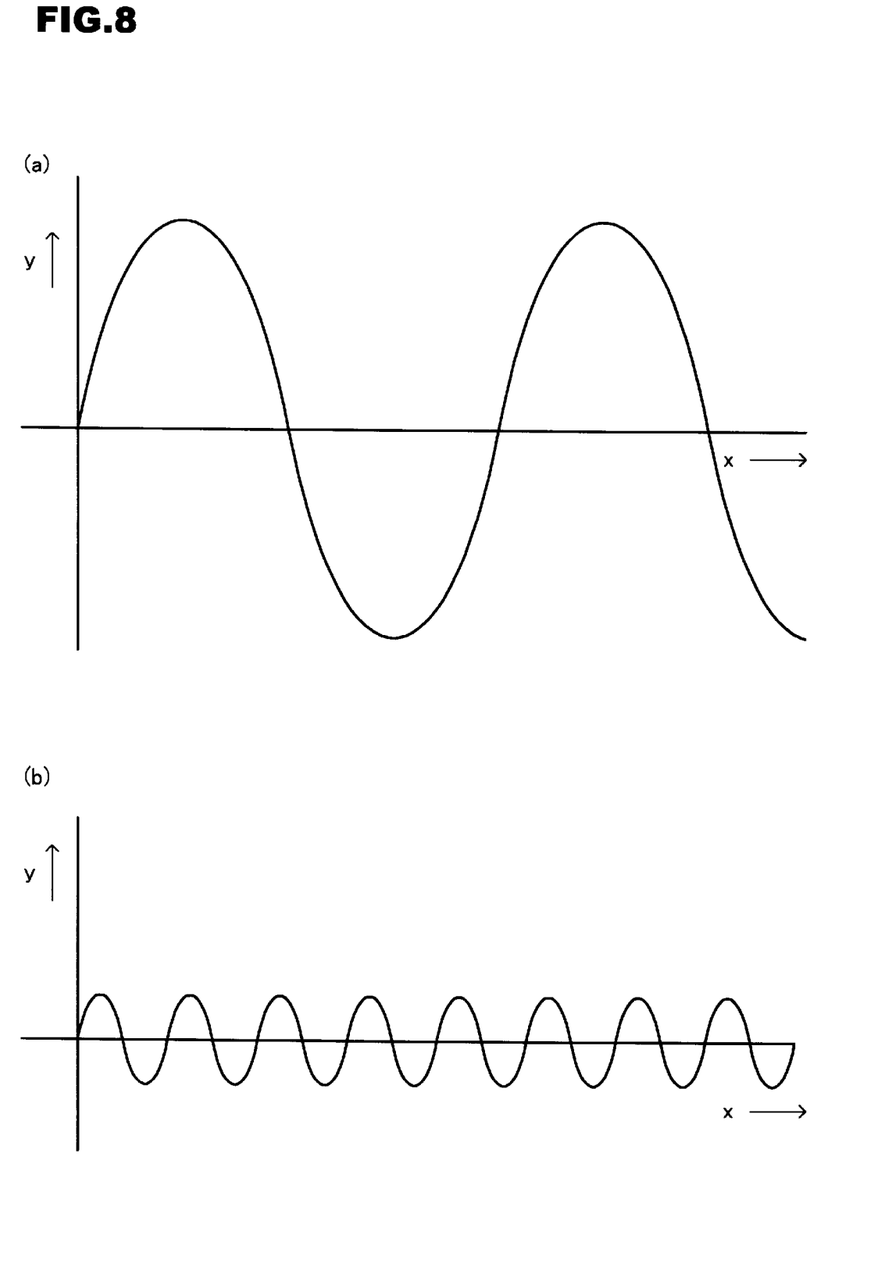
FIG. 8(a) shows a longitudinal profile with high roughness.
FIG. 8(b) shows a longitudinal profile having the same gradient as in FIG. (a) with low roughness.
Figure 9:
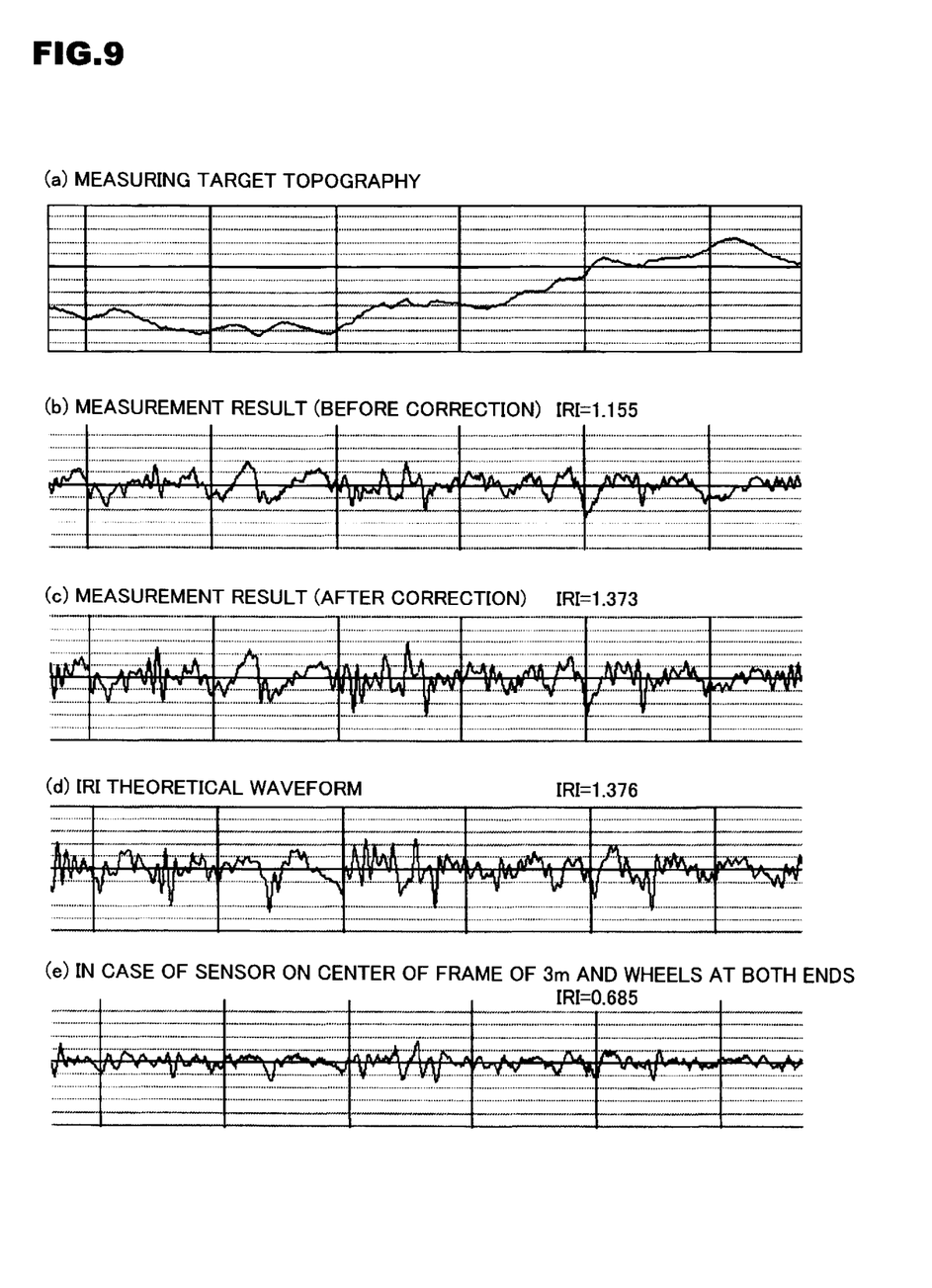
FIG. 9(a) shows a roughness (e.g., height) of topography.
FIG. 9(b) shows an output waveform and an IRI of the relative distance meter in case of measuring the roughness (e.g., height) of the topography shown in FIG. 9(a) by the apparatus in FIG. 7.
FIG. 9(c) shows a waveform and an IRI in the case of carrying out Fourier transform, frequency correction and inverse Fourier transform of a measurement value shown in FIG. 9(b) by the apparatus in FIG. 7.
FIG. 9(d) shows a theoretical waveform and an IRI having an IRI characteristic with respect to the topography of FIG. 9(a)
FIG. 9(e) shows an output waveform of the relative distance meter and an IRI when a grounding distance meter is in the middle between two wheels and no correction is carried out.

FIG. 8 is an explanatory view of this concept where the abscissa represents moving distance and the ordinate represents relative distance in each of two graphs. FIG. 8(a) shows a longitudinal profile with high roughness and FIG. 8(b) shows a longitudinal profile with low roughness. These two longitudinal profiles have a different roughness but a same gradient, and FIG. 8(a) has a long wavelength and FIG. 8(b) has a short wavelength.

An apparatus, such as that of the present invention, for measuring the relative distance to the target surface, generally has a problem that the detecting sensitivity to the short wavelength with the low roughness as FIG. 8(b) is reduced. However, by making the spaces between the wheels and relative distance meter respectively different in dimension, the data measured by the action of the wheel with the short space to the relative distance meter have a large influence on the measurement value, and the data measured by the action of the wheel with the long space to the relative distance meter have a little influence on the measurement value.

The data measured by the action of the wheel with the short space to the relative distance meter strongly reflects a short wavelength component and the data measured by the action of the wheel with the long space to the relative distance meter strongly reflects a long wavelength component. This results in a reflecting of the short wavelength component more strongly to increase the detection sensitivity. Accordingly, it is advantageous in the evaluation manner as the IRI for evaluating the roughness using the gradient.

Optionally, instead of using the above described frequency transforming means, correction coefficient multiplying means, and inverse frequency transforming means, a space between one wheel and the relative distance meter is set to be about ½ of a longer wavelength in the frequency band to be measured of the longitudinal profile. Further, a space between the other wheel and the relative distance meter is set to be about ½ of a shorter wavelength in the frequency band to be measured of the longitudinal profile.

This length may be taken by either internal or external division, namely, the position of the relative distance meter may be inside or outside between one wheel and the other wheel. According to this approach, superposed effects of the long wavelength component, measured by the action of the wheel with the long space to the relative distance meter, and the short wavelength component, measured by the action of the wheel with the short space to the relative distance meter, can be obtained. Thus, the even frequency characteristic can be obtained between the longer wavelength and shorter wavelength.

Of course, it is also possible to combine the configuration in which the wheels and relative distance meter are set with the above spaces with the frequency transforming means, correction coefficient multiplying means and inverse frequency transforming means to obtain a frequency characteristic closer to the desired frequency characteristic. As the inherent frequency characteristic specific to the apparatus becomes more even, the burden (e.g., effect) of the correction of the correction coefficient multiplying means can be reduced to achieve a measurement with higher accuracy.

The wheels described above have a function of physically supporting the frame and a function of holding it a certain distance from the measuring surface. Thus, it is possible to use relative distance meters located on a vehicle instead of on the wheels and to regard output of the relative distance meters substituted for the wheels as a criterion.

Specifically, such a longitudinal profile measuring apparatus includes a plurality of relative distance meters located in a row in a direction of a measuring line on the vehicle for respectively measuring relative distance to a target surface, a moving distance meter located on the vehicle for measuring moving distance of movement along the measuring line on the target surface, and data processing means for finding spatial data, which show a rough profile of the target surface along the measuring line from the relative distance measured by the relative distance meter.

The data processing means includes storing means for storing relative distance data to the target surface measured by the plurality of relative distance meters associated with moving distance data measured by the moving distance meter when moving along the measuring line, and relative distance calculating means for calculating relative distances to be outputted by a main relative distance meter from the relative distance data measured by each relative distance meter.

The main relative distance meter is assumed to be substituted for one of the relative distance meters on the same vertical line as the main relative distance meter and to be supporting a phantom frame supported by phantom wheels which are assumed to be substituted for the other relative distance meters.

In this manner, spatial data is found based on the relative distance from the relative distance calculating means. Further, the plurality of relative distance meters are set so that spaces between the main relative distance meter and the other relative distance meters are such that the apparatus has a gain with a desired frequency characteristic.

Thus, by substituting the other relative distance meters for the wheels which have the function of holding a frame a certain distance from the measuring surface, it is possible to set spaces between the main relative distance meter and the other relative distance with increased freedom.

It is also possible that the apparatus having the plurality of relative distance meters instead of the wheels is combined with the frequency transforming means, correction coefficient multiplying means and inverse frequency transforming means to obtain the frequency characteristic closer to the desired frequency characteristic.

The present disclosure relates to subject matter contained in Japanese Patent Application No. 2000-161246, filed on May 30, 2000, and which is expressly incorporated herein by reference in its entirety.

BRIEF DESCRIPTION OF THE DRAWINGS

The foregoing and other purposes, aspects and advantages will be better understood from the following detailed description of preferred embodiment of the invention with reference to the drawings, in which.

DETAILED DESCRIPTION OF THE PREFERRED EMBODIMENTS OF THE INVENTION

Referring now to the drawings, and more particularly FIGS. 1–13, there are shown preferred embodiments of the method and structures according to the present invention.
First Embodiment Referring to FIGS. 1(a)–9(e), a first embodiment of the present invention will be described below.

Figure 1:
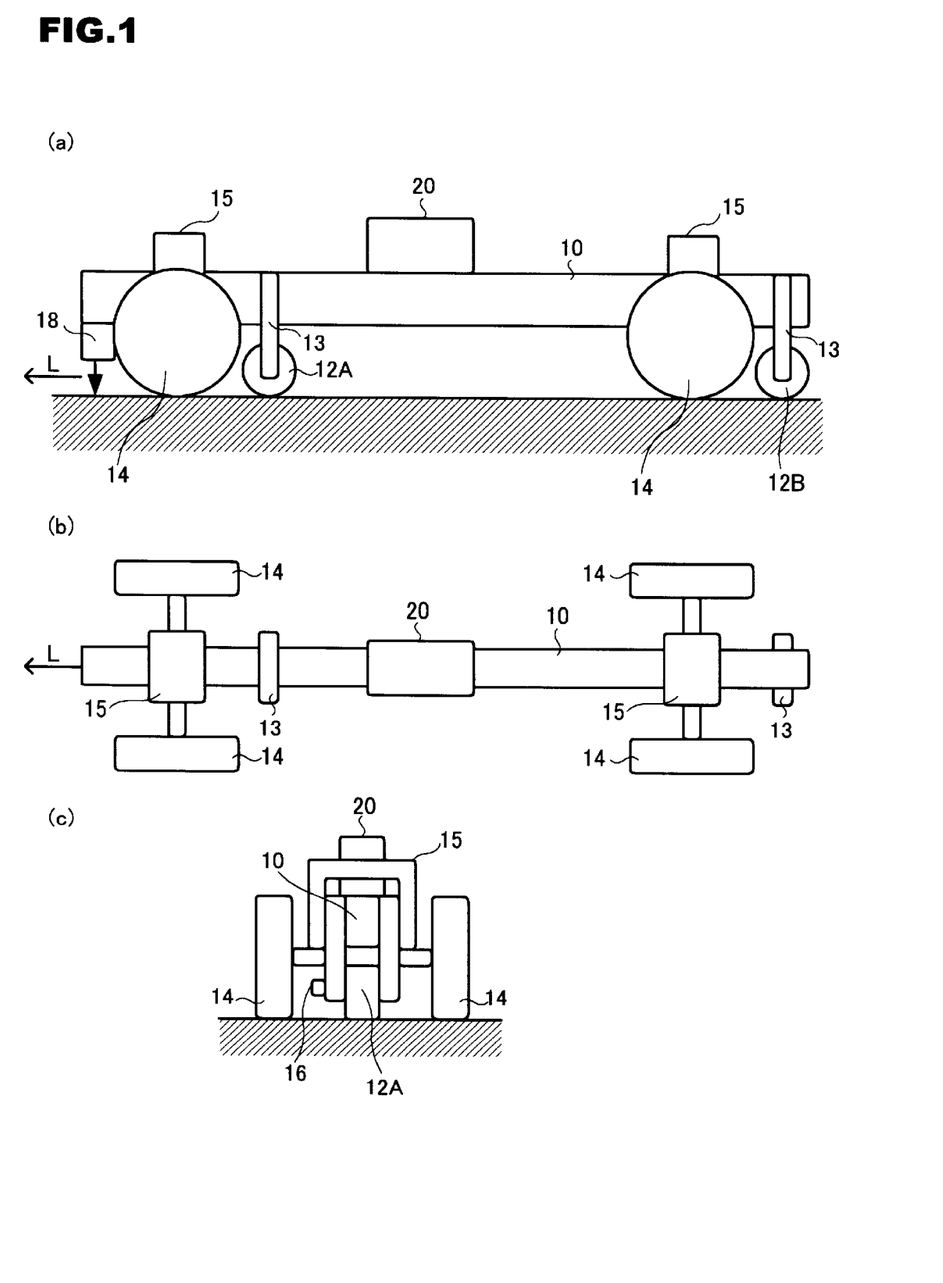
FIG. 1(a) is a schematic view of a configuration of a first embodiment of a longitudinal profile measuring apparatus according to the present invention in a side view.
FIG. 1(b) is a schematic view of a configuration of a first embodiment of a longitudinal profile measuring apparatus according to the present invention in a plan view.
FIG. 1(c) is a schematic view of a configuration of a first embodiment of a longitudinal profile measuring apparatus according to the present invention in a front view.
Figure 2:
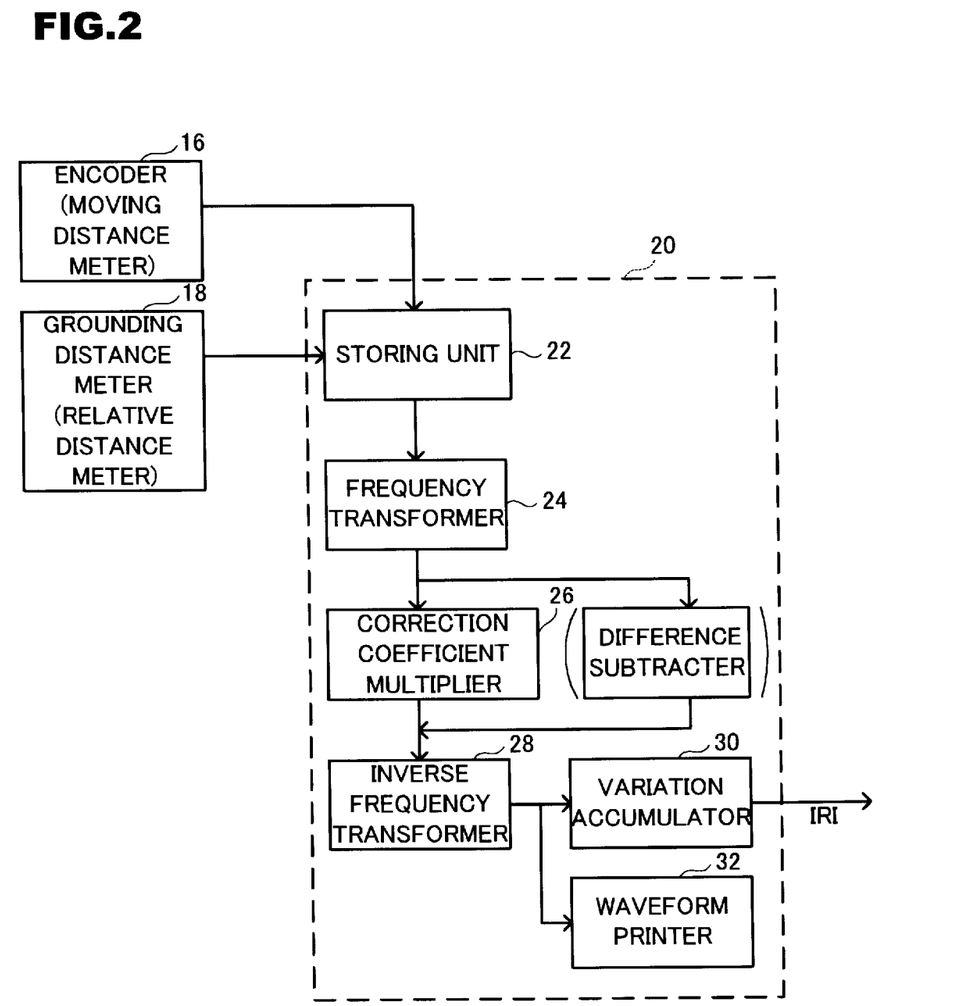
FIG. 2 is a block diagram of the longitudinal profile measuring apparatus in FIG. 1.

In FIG. 1, a schematic view of a configuration showing an embodiment of a longitudinal profile measuring apparatus is shown according to the present invention and in FIG. 2 a block diagram of the apparatus is shown.

The shown apparatus outputs an evaluation value of an IRI and is configured to be pulled or moved by steering a vehicle (not shown) or the like. In a non-limiting embodiment of the present invention, it is assumed the apparatus is four-wheel steered by an unshown mechanism on a road which is a target surface.

A frame 10 is supported by a plurality of (e.g., two in this example) wheels 12A, 12B in a row in a direction of a measuring line L. The respective wheels 12A, 12B are rotatably supported by brackets 13 extending downwardly from the frame 10. On appropriate positions in front of and behind frame 10, support fittings 15 are provided which are displaceable upward and downward relative to the frame 10. The support fittings 15, at lower ends thereof, rotatably support auxiliary wheels 14, 14 which project in both directions. The auxiliary wheels 14, 14 are provided merely for preventing rolling of the frame 10 and a load of the frame 10 is substantially received by the wheels 12A, 12B.

Located near the wheel 12A is an encoder (e.g., moving distance meter) 16 for detecting rotation of the wheel 12A to detect a moving distance of the apparatus. Located on the frame 10 is a grounding distance meter 18 which is a relative distance meter. More specifically, the grounding distance meter 18 may be configured by a laser distance meter, ultrasonic distance meter, or radio distance meter. The grounding distance meter 18 is mounted such that a space between the grounding distance meter 18 and wheel 12A is set to be 1 and a space between the grounding distance meter 18 and wheel 12B is larger than 1.

Further, located on the frame 10 is a data processing unit 20 which processes outputs from the encoder 16 and grounding distance meter 18. The data processing unit 20 receives data of outputs from the encoder 16 and grounding distance meter 18, then processes the data and outputs the IRI.

As shown in FIG. 2, the data processing unit 20 is provided with a storing unit 22, frequency transformer 24, correction coefficient multiplier 26, inverse frequency transformer 28, variation accumulator 30 and waveform printer 32. The data processing unit 20 may be partly configured by either of hardware or software.

The storing unit 22 stores moving distance data from the encoder 16 associated with relative distance data from the grounding distance meter 18. These stored data (e.g., spatial data) are transformed into amplitude corresponding to frequency by, for example, Fourier transform in the frequency transformer 24.

The Fourier-transformed data are multiplied by a coefficient of correction (e.g., by the correction coefficient multiplier 26) for correction to have a frequency characteristic corresponding to the IRI, and subsequently returned again to the spatial data by inverse Fourier transform by the inverse frequency transformer 28 to be distance variation data of gradient. The variations of gradient are accumulated by the variation accumulator 30 for finding the IRI and the variation waveform of the gradient is printed by the waveform printer 32 as required.

Optionally, the data processing unit 20 can be provided with a difference subtracter in which the Fourier-transformed data are subtracted and a difference having a phase characteristic corresponding to the golden car.

FIG. 7(b) specifically shows an inherent frequency characteristic specific to this apparatus when the space between the grounding distance meter 18 and wheel 12A in FIG. 7(a) is a=1 m and the space between the grounding distance meter 18 and wheel 12B is 9a=9 m. If the coefficient of correction as shown in FIG. 7(c) is determined in advance with respect to the inherent frequency characteristic, the characteristic after being multiplied by the coefficient of correction becomes identical to the IRI characteristic shown in FIG. 7(b).

The frame 10 is moved in the direction of the measuring line L by pulling or moving. The relative distance data from the grounding distance meter 18 is captured at every certain distance over a predetermined section of the measuring line L based on moving distance data obtained by the encoder 16 and stored in the storing unit 22.

FIG. 9(a) shows an example of rough topography which is a measuring target, on which the abscissa represents distance and the ordinate represents height. FIG. 9(b) shows a measurement result in the case of a=1 m in FIG. 7(a), on which the abscissa represents moving distance and the ordinate represents relative distance.

FIG. 9(b) shows the IRI in the case where the variation of the relative distance is merely accumulated without frequency correction and this accumulation is considered to be identical to the accumulation of the gradient (e.g., considering them identical has little influence) and IRI=1.155.

On the other hand, FIG. 9(c) shows a waveform after the Fourier transform in the frequency transformer 24. The data has been multiplied by the coefficient of correction found in advance in FIG. 7(c) by the correction coefficient multiplier 26 and is transformed into the spatial data, representing a relationship between the gradient and moving distance, by the inverse Fourier transform by the inverse frequency transformer 28, and variations of gradient are accumulated by the variation accumulator 30 and IRI=1.373.

In a measured value, the ordinate represents the relative distance but since finding the IRI requires the gradient, the transform from the relative distance to the gradient may be included in the coefficient of correction.

FIG. 9(d) shows a theoretical waveform when measuring the topography in FIG. 9(a) by the apparatus having the IRI characteristic and IRI=1.376. Accordingly, it can be found that the correction may make the IRI close to the theoretical value.

Second Embodiment

In the first embodiment, the correction is made by the correction coefficient multiplier 26, however, only differing a ratio of the spaces between the grounding distance meter 18 and wheels 12A, 12B from 1 may also make the IRI close to the theoretical value without correction.

Figure 10:
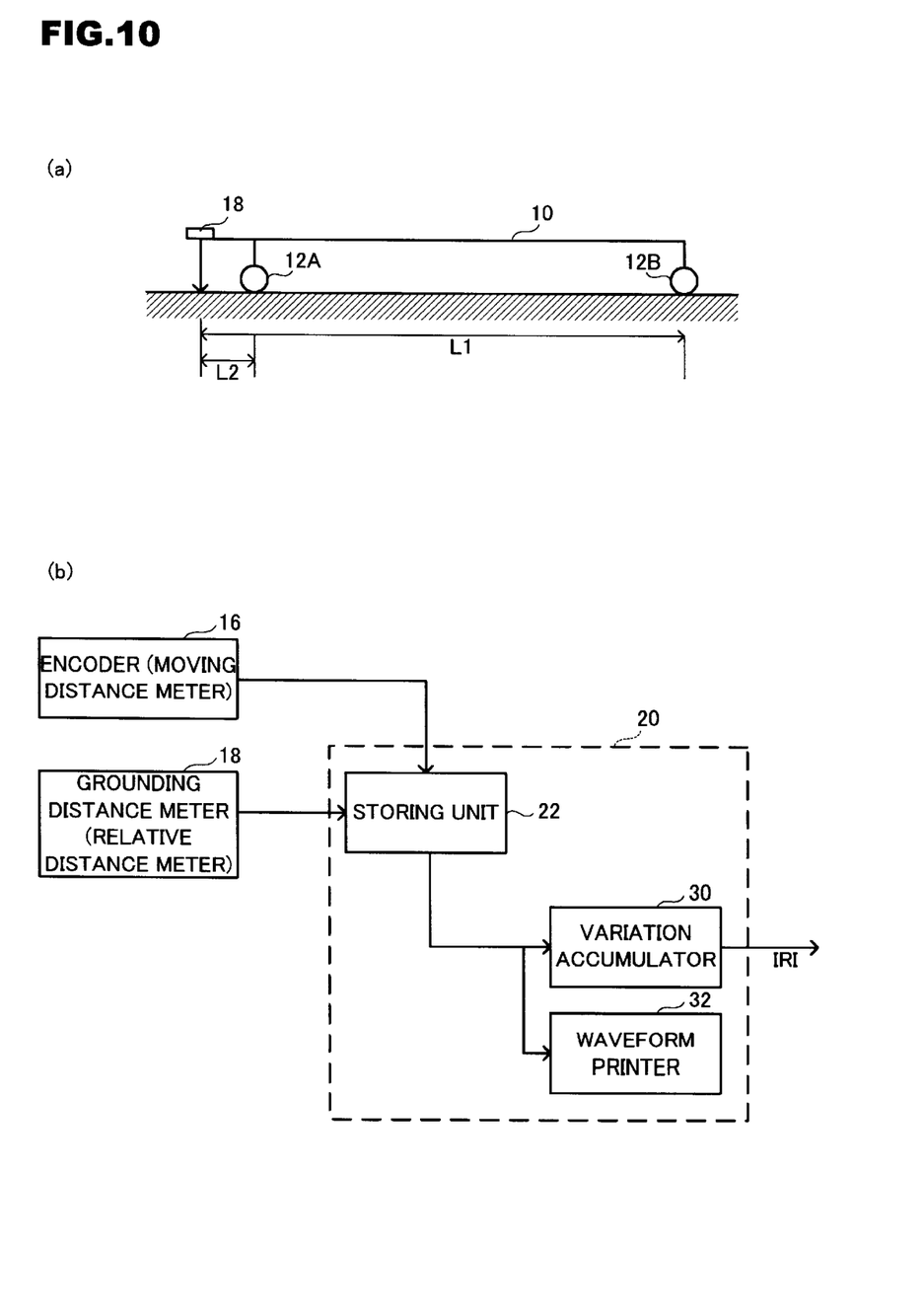
FIG. 10(a) in a second embodiment of the present invention shows a schematic view of a configuration of a second embodiment of a longitudinal profile measuring apparatus according to the present.
FIG. 10(b) shows a block diagram of the second embodiment of FIG. 10(a)

FIG. 10 shows a second non-limiting embodiment according to the present invention, having a configuration as shown in FIG. 2 with the frequency transformer 24, correction coefficient multiplier 26 and inverse frequency transformer 28 omitted.

As a comparative example, FIG. 9(e) shows a waveform and an IRI where the measurement is carried out by the apparatus in which the grounding distance meter 18 is located on the center of the frame 10 of 3 m and both ends of the frame 10 are supported by the wheels 12A, 12B without correction.

On the other hand, as shown in FIG. 10(a), differentiating the space between the grounding distance meter 18 and wheel 12A from the space between the grounding distance meter 18 and wheel 12B results in the measurement result shown in FIG. 9(b). Thus, an apparatus can be obtained in which the IRI is closer to the theoretical value and which has the characteristic closer to the IRI characteristic.

Thus, a longer space, namely a space L1 between the grounding distance meter 18 and wheel 12B is preferably about ½ of a longer wavelength in a frequency band to be measured. Also, a shorter space, namely a space L2 between the other wheel and relative distance meter is preferably about ½ of a shorter wavelength in the frequency band to be measured of the longitudinal profile. In this manner, the whole frequency band to be measured is covered.

Third Embodiment

Figure 11:
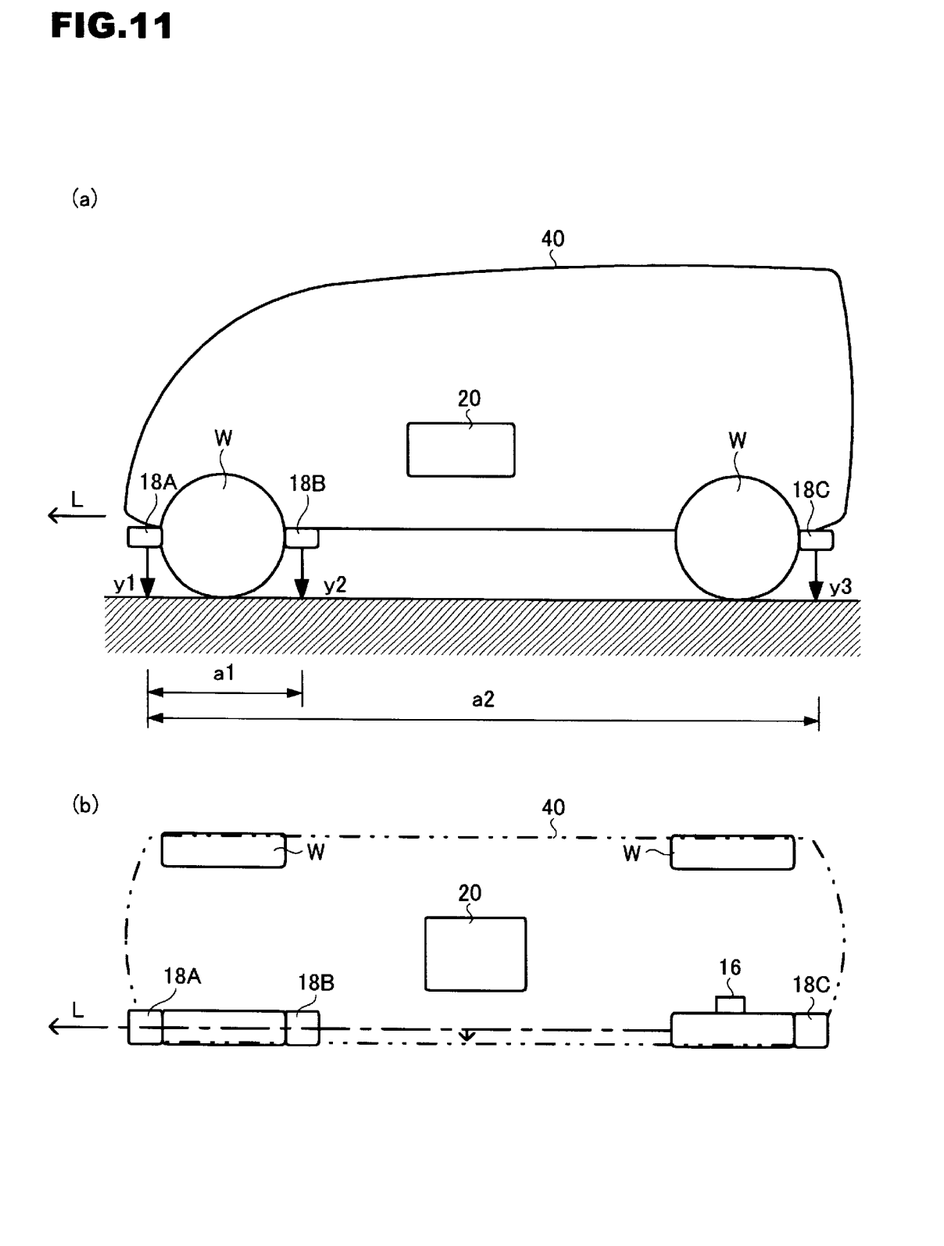
FIG. 11(a) is a schematic side view of a configuration of a third embodiment of a longitudinal profile measuring apparatus according to the present invention.
FIG. 11(b) is a schematic plan view of a configuration of a third embodiment of a longitudinal profile measuring apparatus according to the present invention.
Figure 12:
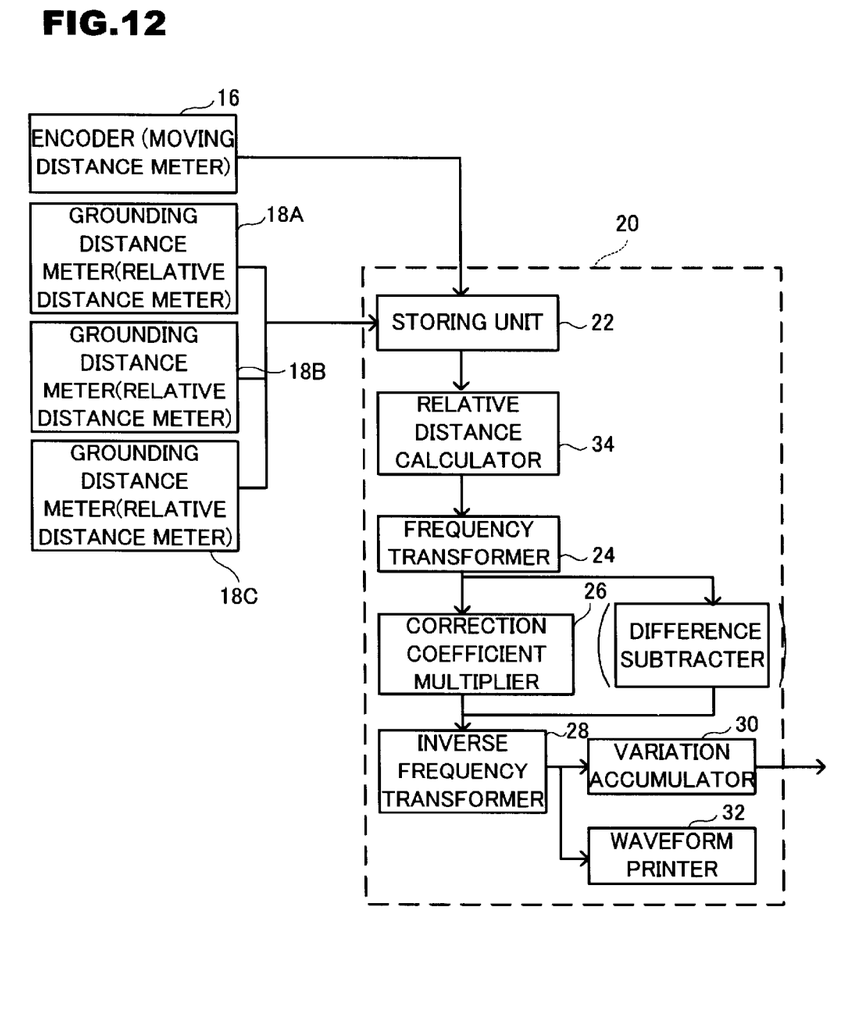
FIG. 12 is a block diagram of the longitudinal profile measuring apparatus of FIGS. 11(a) and 11(b)

FIGS. 11 and 12 show a third embodiment. In this embodiment, the apparatus is provided on a moving vehicle 40 on which three grounding distance meters 18A, 18B, 18C (e.g., relative distance meters) are located in a row in a direction of a measuring line L, and in which an encoder 16 (e.g., moving distance meter) is located on one of the wheels W of the moving vehicle 40 on the measuring line L for detecting rotation of the wheel W to detect a moving distance of the apparatus.

Each of the grounding distance meters 18A, 18B, 18C may be configured by a laser distance meter, an ultrasonic distance meter, or a radio distance meter. A relative distance calculator 34 is added to the data processing unit 20 of the configuration in the first embodiment.

In this embodiment, in comparison to the first and second embodiments, the grounding distance meters 18B, 18C are provided instead of the wheels 12A, 12B and the grounding distance meter 18A is the grounding distance meter corresponding to the grounding distance meter 18 in the first embodiment (e.g., also called the main grounding distance meter) and the grounding distance meters 18B, 18C (also called the sub grounding meter) are the others.

When a relative distance detected by the grounding distance meter 18A is y1, a relative distance detected by the grounding distance meter 18B is y2, and a relative distance detected by the grounding distance meter 18C is y3, a value of the original grounding distance meter 18A corresponding to the grounding distance meter 18 in the first embodiment is corrected using the following equation on the basis of the grounding distance meters 18B, 18C substituted for the wheels.

$$f(x) = C - \left(y1 - \frac{a2 \times y2 \times a1 \times y3}{a2 + a1}\right) \tag{6}$$

Here, C represents a mounting height of the wheel and is a constant. When divided externally, "a1" is negative. The above equation (6) is for finding the grounding distance of the grounding distance meter 18A with assuming that a phantom frame is supported by the substituted wheels at the grounding distance meters 18B and 18C and assuming the grounding distance meter 18A to be on an extension thereof, as in the first embodiment. In the relative distance calculator 34, the equation (6) is calculated and thereafter, the same processes as in the first embodiment are carried out for the frequency transformer 24 and after.

As described above, the same operation and effect as the first embodiment can be obtained in this embodiment. This embodiment includes no measuring wheels 12A, 12B so that a high-speed measurement can be achieved. Appropriately setting the spaces among the 18A, 18B and 18C results in obtaining a desired frequency characteristic and frequency band.

In the above description, the grounding distance meter 18A is the main grounding distance meter, and the other grounding distance meters 18B and 18C are the sub grounding distance meters substituted for the wheels.

However, the present invention is not limited to this and it is possible for the grounding distance meter 18B or 18C to be the main grounding distance meter and to appropriately switch the main grounding distance meter.

Further, it is also possible to adopt, as the relative distance, the value obtained by the respective relative distances calculated by the equation (6) assuming the respective grounding distance meters 18B or 18C as a main grounding distance meter. The calculated respective relative distances are multiplied by respective predetermined weightings, and the weighted relative distances are averaged. Thus, the frequency characteristic and frequency band of the apparatus can be changed to make the apparatus with higher freedom.

Figure 13:
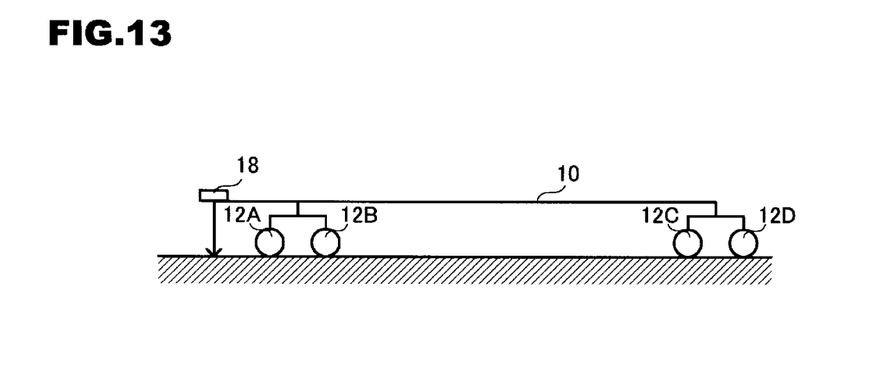
FIG. 13 is a schematic view of a configuration of an example of the longitudinal profile measuring apparatus using a sub-frame structure according to the present invention.

In the first and second embodiments, a simple configuration with two wheels without a sub-frame is described, however, the present invention is not limited to this configuration and the sub-frame structure, as shown in FIG. 13, may be adopted.

As described above, according to the present invention, an apparatus having a desired frequency characteristic can be obtained by means of a conventional longitudinal profile measuring manner of a wheel type which is low in price.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A longitudinal profile measuring apparatus for a vehicle, comprising:
    a plurality of relative distance meters located in a row in a direction of a measuring line on the vehicle for respectively measuring relative distance to a target surface;
    a moving distance meter located on the vehicle for measuring moving distance of movement along the measuring line on the target surface, and
    data processing means for finding spatial data, which show a rough profile of the target surface, along the measuring line from the relative distance measured by the relative distance meter,
    wherein said data processing means comprises:
        storing means for storing relative distance data to the target surface measured by the plurality of relative distance meters associated with moving distance data measured by the moving distance meter when moving along the measuring line;
        relative distance calculating means for calculating relative distances to be outputted by a main relative distance meter from the relative distance data measured by each relative distance meter, said main relative distance meter being assumed to be substituted for one of the relative distance meter on the same vertical line as the main relative distance meter and to be supported by a phantom frame supported by phantom wheels which are assumed to be substituted for the other relative distance meters, and said plurality of relative distance meters being set so that a first space between the main relative distance meter and one of the phantom wheels is set to be about ½ of a longer wavelength in a frequency band to be measured of the longitudinal profile, and a second space between the main relative distance meter and another of the phantom wheels is set to be about ½ of a shorter wavelength in the frequency band to be measured of the longitudinal profile;
        frequency transforming means for transforming the relative distance data from the relative distance calculating means into an amplitude corresponding to frequency;
        correction coefficient multiplying means for multiplying the amplitude corresponding to frequency by a correction coefficient for allowing the apparatus to have a gain with a desired frequency characteristic; and
        inverse frequency transforming means for inverse transforming the corrected amplitude to find the corrected spatial data of the target surface.

2. The longitudinal profile measuring apparatus according to claim 1, wherein said desired frequency characteristic is an IRI (International Roughness Index) characteristic.

3. The longitudinal profile measuring apparatus according to claim 2, further comprising:
    variation accumulating means for accumulating variations of gradient over a desired section of the measuring line, said variation of gradient being obtained from the corrected spatial data from said inverse frequency transforming means.

4. The longitudinal profile measuring apparatus according to claim 1, wherein said plurality of relative distance meters comprise at least one of laser distance meters, ultrasonic distance meters, and radio distance meters.

5. A longitudinal profile measuring apparatus for a vehicle, comprising:
    a plurality of relative distance meters located in a row in a direction of a measuring line on the vehicle for respectively measuring relative distance to a target surface;
    a moving distance meter located on the vehicle for measuring moving distance of movement along the measuring line on the target surface; and
    a data processor for finding spatial data, which show a rough profile of the target surface, along the measuring line from the relative distance measured by the relative distance meter,
    wherein said data processor comprises:
        a storing unit for storing relative distance data to the target surface measured by the plurality of relative distance meters associated with moving distance data measured by the moving distance meter when moving along the measuring line;
        a relative distance calculator for calculating relative distances to be outputted by a main relative distance meter from the relative distance data measured by each relative distance meter, said main relative distance meter being assumed to be substituted for one of the relative distance meter on the same vertical line as the main relative distance meter and to be supported by a phantom frame supported by phantom wheels which are assumed to be substituted for the other relative distance meters, and said plurality of relative distance meters being set so that a first space between the main relative distance meter and one of the phantom wheels is set to be about ½ of a longer wavelength in a frequency band to be measured of the longitudinal profile and a second space between the main relative distance meter and another of the phantom wheels is set to be about ½ of a shorter wavelength in the frequency band to be measured of the longitudinal profile,
        a frequency transformer unit for transforming the relative distance data from the relative distance calculator into an amplitude corresponding to frequency;
        a correction coefficient multiplier for multiplying the amplitude corresponding to frequency by a correction coefficient for allowing the apparatus to have a gain with a desired frequency characteristic; and
        an inverse frequency transformer for inverse transforming the corrected amplitude to find the corrected spatial data of the target surface.

6. The longitudinal profile measuring apparatus according to claim 5, wherein said desired frequency characteristic comprises an International Roughness Index (IRI) characteristic.

7. The longitudinal profile measuring apparatus according to claim 6, further comprising:
    a variation accumulator for accumulating variations of gradient over a desired section of the measuring line, said variations of gradient being obtained from the corrected spatial data from said inverse frequency transformer.

* * * * *